United States Patent Office 2,990,892
Patented July 4, 1961

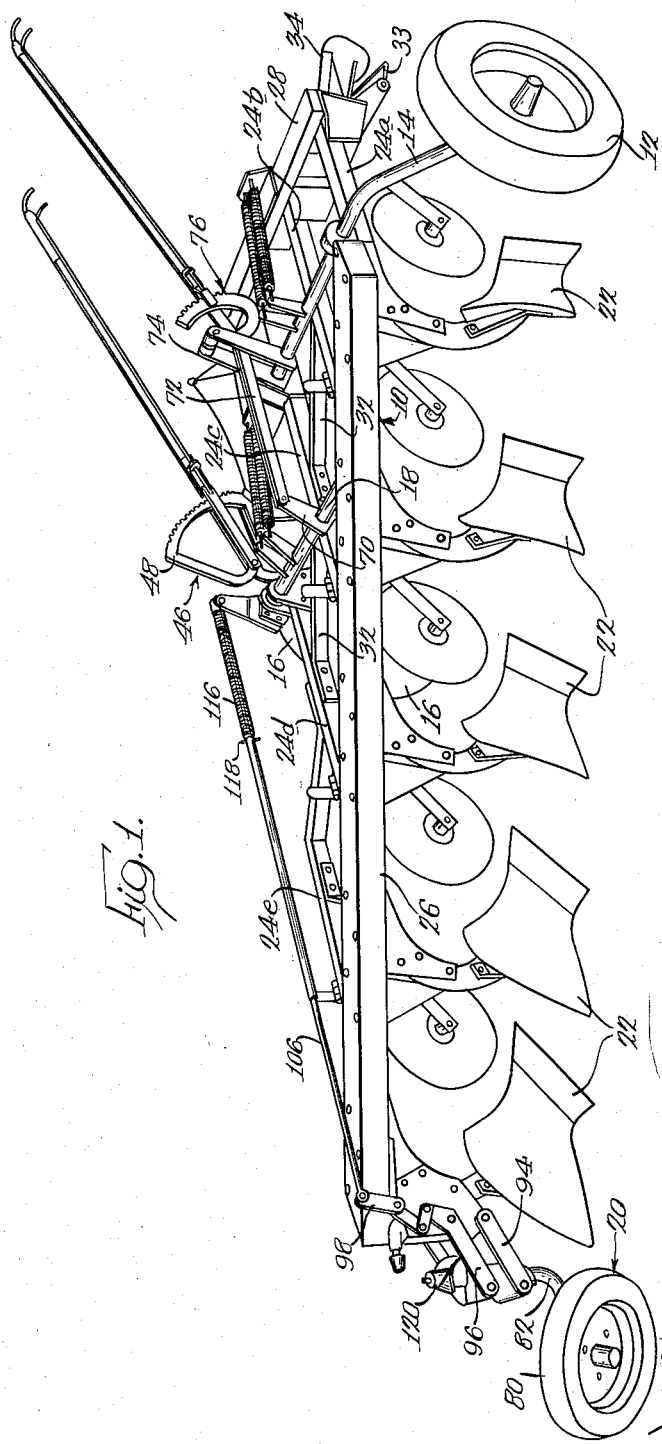

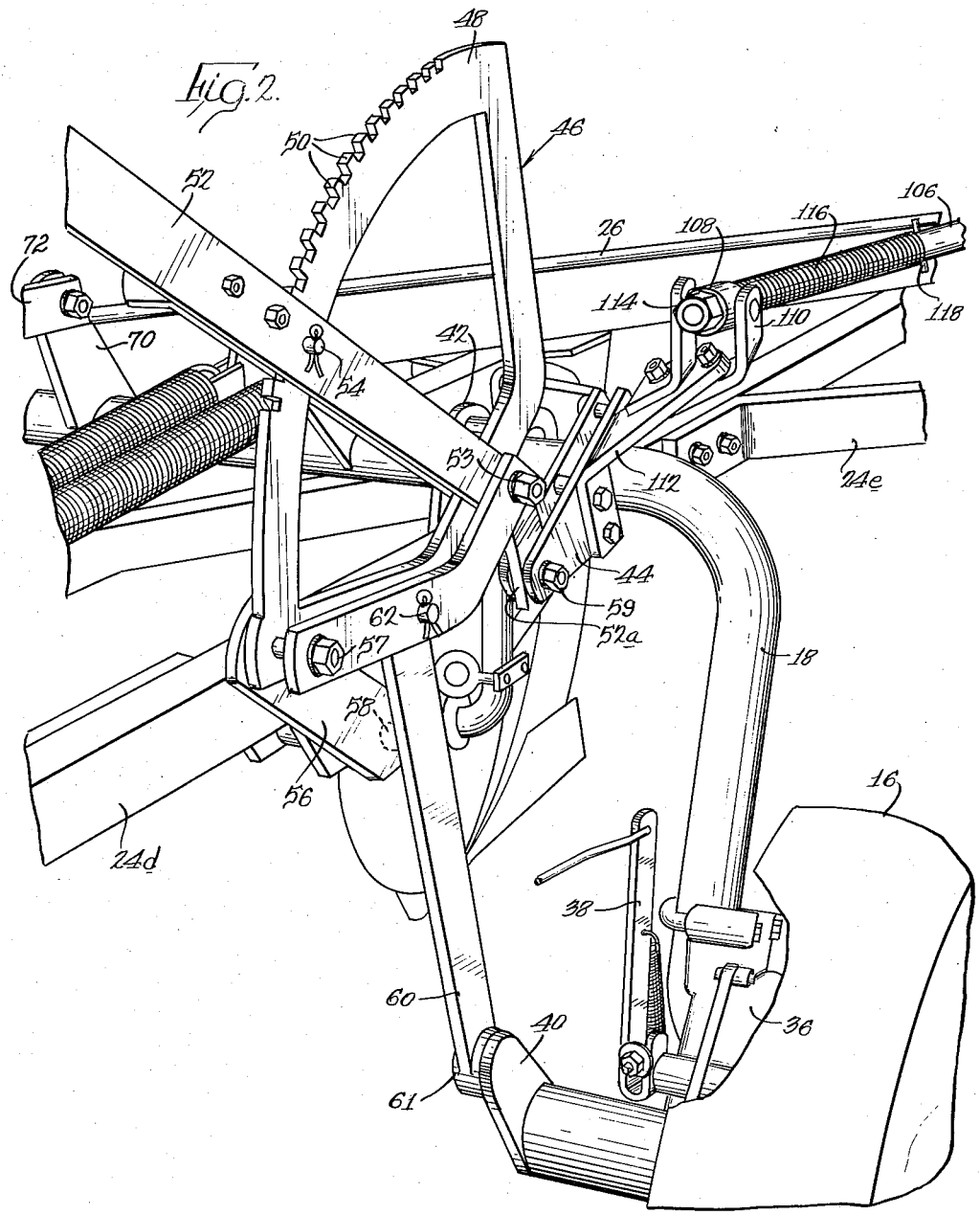

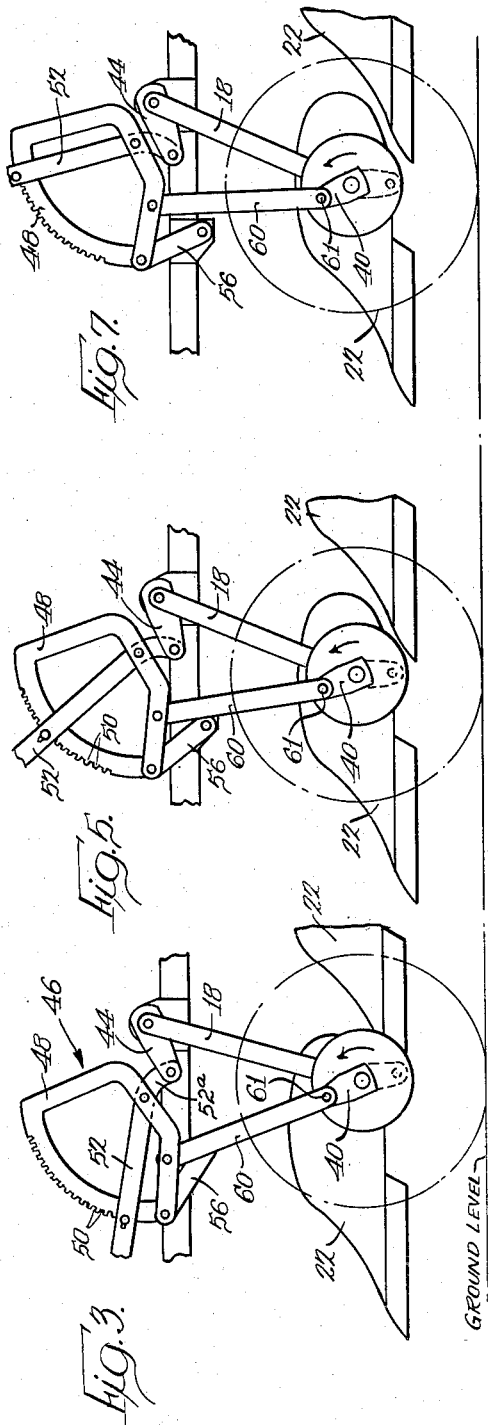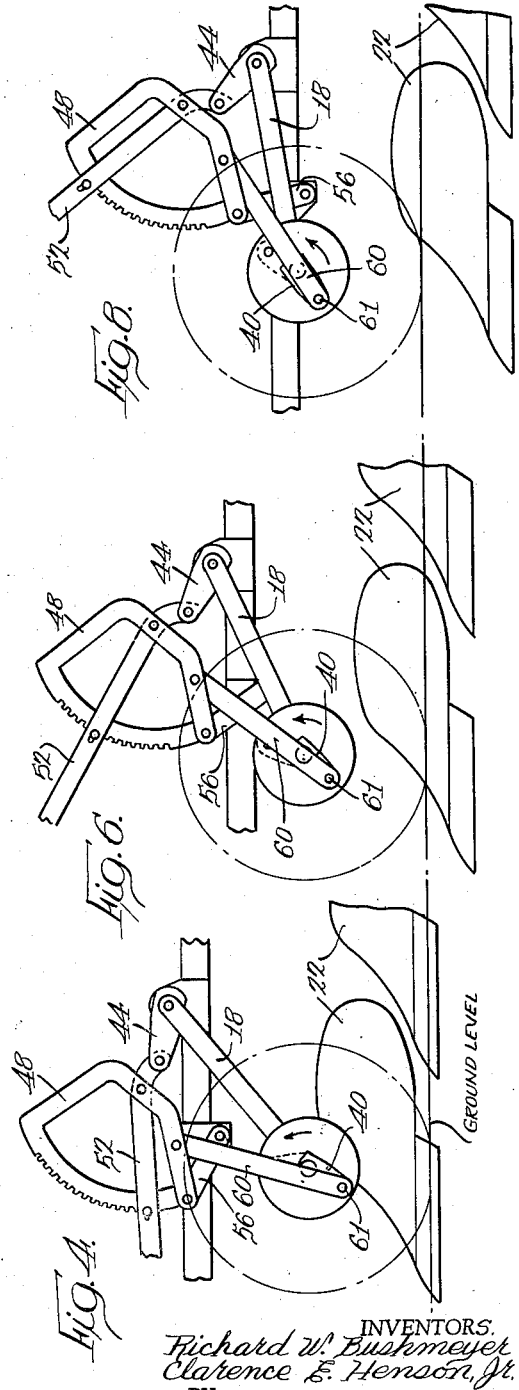

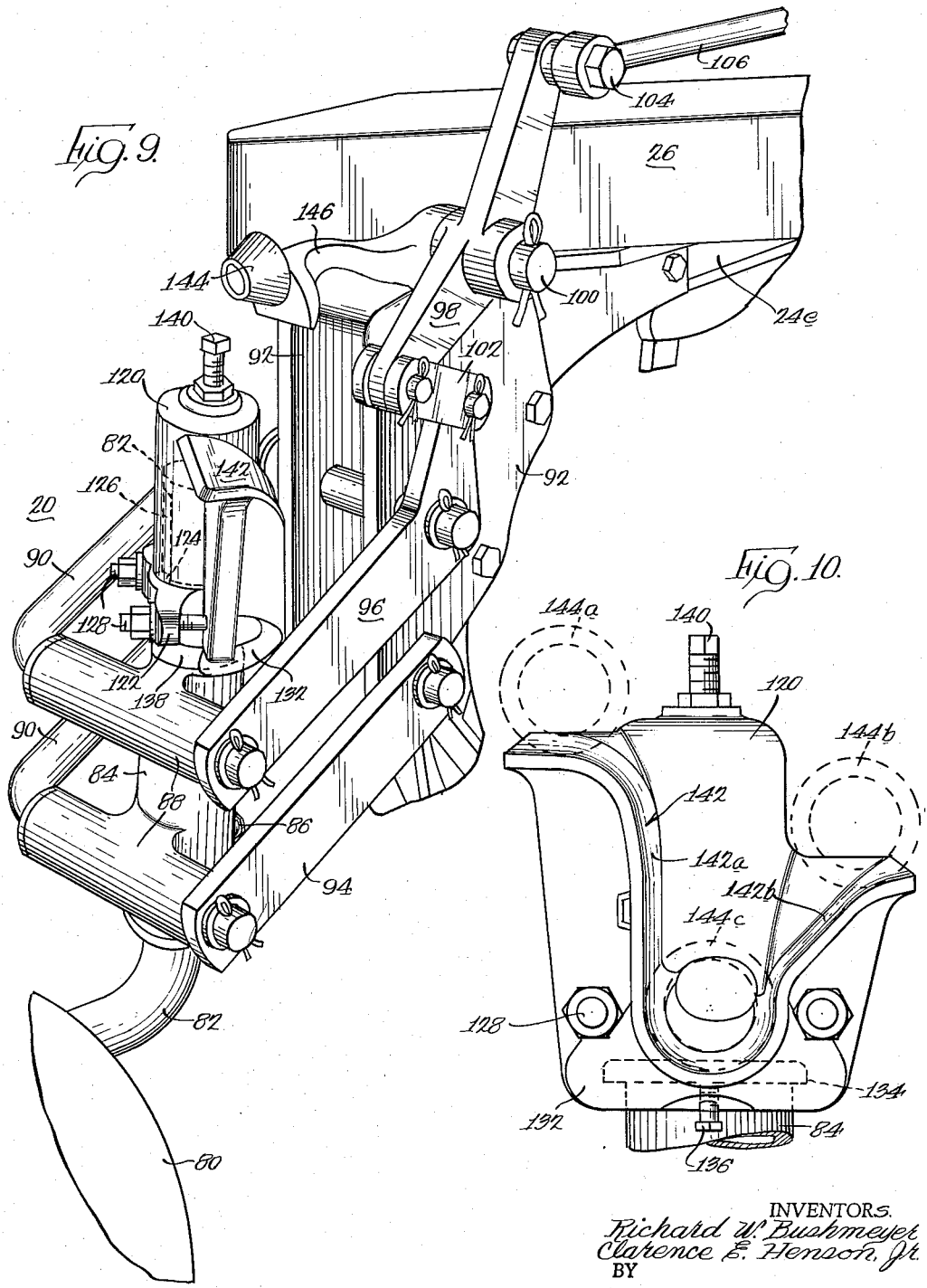

2,990,892
AGRICULTURAL IMPLEMENT
Richard W. Bushmeyer and Clarence E. Henson, Jr., Rockford, Ill., assignors to J. I. Case Company, a corporation of Wisconsin
Filed Aug. 9, 1957, Ser. No. 677,368
6 Claims. (Cl. 172—404)

This invention relates generally to agricultural implements and is more particularly directed to improvements in tractor drawn plows.

In the design and construction of earth-working implements, such as plows, there is usually provided means for adjusting the depth of penetration of the earth-working tool. In wheel supported implements, which are adapted to be drawn by a vehicle such as a tractor, it is also necessary to provide for vertical adjustment between the frame and the supporting wheel structure, in order to be able to move the tools supported on the frame between an elevated position of transport and a lowered, ground working position. Various adjusting means have been devised heretofore, which have attempted to correlate the two mentioned adjustments so that uniform clearance is provided for the tools, when raised to a transport position, irrespective of the adjusted ground working depth of the tools. Generally, such prior devices have not provided a sufficiently constant or uniform clearance, particularly in that in such devices the clearance for the tools, when adjusted for maximum soil penetration, is substantially less than that afforded when the tools are set for relatively shallow penetration. Consequently, there is provided inadequate clearance for trash, and the like, when the tools are raised out of the ground from their position of greatest working depth.

Furthermore, the above-mentioned problem of uniform ground clearance is particularly troublesome with relatively long ground-working implements, such as multiple-bottom plows, wherein the clearance provided for the plow bottoms in their transport position is dependent to a substantial extent upon the vertical adjustment provided for the implement in a lengthwise direction. In a multiple-bottom plow there is usually provided a three wheel support, comprising a land wheel, a forward furrow wheel and a rearward furrow or tail wheel. While the adjustment of the land and forward furrow wheels raises and lowers the plow bottoms, some adjustment must also be provided for the rear furrow wheel, if the clearance provided for the several plow bottoms is to be substantially uniform and the plow is to be transported in a substantially level position. Consequently, any effective means for raising and lowering the plow bottoms should include a suitable corresponding adjustment for the vertical position of the rear furrow wheel.

It is the principal object of this invention to provide means for vertically adjusting a wheel-supported, earth-working implement, wherein the ground-engaging tools on such implement are elevated to a substantially constant height above the ground level, irrespective of the depth of penetration of such tools when in their ground-working position. A further object is to provide an improved constant-height lift mechanism for a tractor drawn, wheel-supported plow, wherein the lever and quadrant affording a working depth adjustment for the plow bottoms is carried by a double-pivot toggle arrangement having connection with the wheel supporting crank axle and the plow frame in a manner providing for depth adjustment of the plow bottoms, while affording a constant and uniform clearance of the plow bottoms with respect to the ground when the lift mechanism is operated to raise the plow bottoms to a position for transport.

It is also an object of this invention to provide improved means for vertically adjusting and positioning the rear or tail wheel of a tractor drawn plow, including novel means for locking such rear wheel in position for plowing operations. Other objects and advantages will be apparent from the following description of a selected embodiment of the invention, as seen in the accompanying drawings, wherein:

FIGURE 1 is a perspective view of a multiple-bottom tractor-drawn plow.

FIGURE 2 is an enlarged elevational view, in perspective, of the lift mechanism for the plow.

FIGURES 3–8 are schematic illustrations of the operation of the lift mechanism.

FIGURE 9 is an enlarged fragmentary view, in perspective, of the rear wheel structure.

FIGURE 10 is an enlarged elevational view of a portion of the structure seen in FIGURE 9.

With reference to FIGURE 1, it will be seen that the selected embodiment is a tractor-drawn, five-bottom plow including a frame structure 10, a forward furrow wheel 12 supported on the frame by a crank axle 14 so as to afford swinging movement of the furrow wheel relative to the frame, a land wheel 16 also swingably mounted on a second crank axle 18, a rear furrow wheel or tail wheel structure 20, and a series of moldboard plows 22 fixed to the frame.

More particularly, it will be noted that the plow frame 10 comprises a plurality of plow beams 24a, 24b, 24c, 24d, and 24e, which are disposed in generally parallel and laterally spaced positions on the frame, a rear frame member 26 which rigidly joins the rearward ends of the plow beams in staggered relation to each other, preferably through the use of bolted connections between the frame members and the plow beams, and a forward frame member 28 which rigidly joins the front ends of the plow beams on the four forwardmost plows. The use of the fabricated beams 26 and 28 provides a very rigid construction, and additional bracing may be readily and inexpensively provided between intermediate portions of the several plow beams, as by the brace members 32.

Suitable means is provided at the forward end of the plow structure for coupling the latter with a tractor or other pulling unit. Preferably, the hitch mechanism includes a cross bar 33 which is pivotally connected with each of the four forwardly extending plow beams, and a draw bar structure 34 extends forwardly from this cross bar in position for attachment with a tractor drawbar or the like.

Referring now particularly to FIGURE 2, it is seen that the lift mechanism provided for the plow comprises a lifting clutch 36 which is carried by the crank axle 18 and is connected with the land wheel 16 for operation thereby in a known manner to provide for lifting of the plow in response to rotation of the wheel 16. The lift clutch 36 includes a trip lever 38 which is operable from a position on the tractor. When the clutch is connected in driven relation with the wheel 16, the rotation of wheel 16 effects a corresponding swinging movement of a crank arm 40 which is disposed adjacent the inner side of the land wheel. As will be seen hereinafter, this rotation of the crank arm 40 is effective to swing the crank axle 18 relative to the plow frame and thereby raise and lower the plow frame relative to the ground.

The crank axle 18 for the land wheel 16 is suitably rotatably mounted on the plow frame, as by a plurality of bearing brackets 42, and this crank axle has fixed thereto, in forwardly extending relation, an arm or bracket 44 which is connected at its free end with the depth adjusting means for the plow, indicated generally at 46 in FIGURE 2. More particularly, the depth adjusting means 46 comprises an adjusting quadrant 48 having an arcuate portion including a series of notches 50 therein, and an adjusting lever 52. The lever 52 is pivotally mounted on the quadrant 48, as by bolt 53, for swinging movement relative thereto, and this lever also includes a pin 54 or the like in position for selective engagement with one of the notches 50 on the quadrant. The forward portion of the quadrant 48 is pivotally connected to the plow frame by means of the link 56. One end of the link 56 is pivoted on the quadrant, through means of a bolt 57, and the other end of this link is pivotally connected to a bracket fixed on the beam 24d, as by a pin 58. A rearward portion of the adjusting quadrant is pivotally connected with the crank axle 18, through a lower end portion 52a of the lever 52, as by the bolt 59. Thus it is seen that the adjusting quadrant 48 is supported on the plow by a double-pivot toggle linkage, referred to herein as a double-toggle linkage, so that the adjusting quadrant 48 is movable longitudinally of the plow frame as well as vertically with respect to the frame. The adjusting quadrant is also pivotally connected to the crank axle 18 on the lifting clutch 36 by means of a lift link 60. This lift link 60 has its lower end pivotally connected to the outer end portion of the crank arm 40 on the lift clutch, as by a pin 61, and the upper end portion of the lift link 60 is pivotally connected to the quadrant 48, as by a pin 62, at a position intermediate the two supporting pivots 58 and 59 for the quadrant.

The effect of the described lift linkage on the adjustments provided for the plow structure is best seen in FIGURES 3 through 8, wherein various positions of adjustment are shown in connection with both the transport and the ground-working positions of the plow bottoms 22. In FIGURES 3 and 4 it will be noted that the adjusting lever 52 is positioned on quadrant 48 to provide a minimum depth of plowing when the plow bottoms are lowered into the ground, and these figures illustrate the transport and ground-working positions, respectively, for the plow.

FIGURES 5 and 6 depict an intermediate position of depth adjustment for the plow bottoms, as related to the transport and ground-working positions, respectively. FIGURES 7 and 8 similarly illustrate the two positions of the plow bottoms when adjusted for maximum penetration of the soil.

It will be noted from FIGURES 3, 5 and 7 that the described construction of the adjusting quadrant 48 and the lever 52, including the connections afforded between these elements and the lifting clutch arm 40, plow frame 10, and the crank axle 18, is such that a change in the position of the adjusting lever, when the tools are in transport position, moves the upper end of the lift link 60 in a rather flat horizontal path, due to the longitudinal shifting afforded for the adjusting quadrant by the toggle links 56 and 52a. Furthermore, when the plow bottoms are in their ground engaging position, any change in the position of the adjusting lever 52 is accompanied by movement of the upper end of the lift link 60 about the pivot connection 61 with the clutch crank arm 40, in a rearwardly and upwardly moving path, as seen in FIGURES 4, 6 and 8, due to the described relationship of quadrant 48, lift link 60, and toggle links 56 and 52a.

As a result of the movement thus afforded for the various members of the lift linkage 46, the plow bottoms 22 are raised, by operation of clutch 36, to substantially the same elevation with respect to the ground line, as seen in FIGURES 3, 5 and 7, even though the plows are adjusted for the widely varying working depths illustrated in FIGURES 4, 6 and 8, respectively.

With respect to FIGURES 3–8, the alternate position for the clutch crank arm 40 is shown in dotted lines and the direction of rotation of the clutch is indicated by an arrow. In the preferred embodiment of the invention, wherein the clutch 36 is a known type generally referred to as a half-revolution clutch, the positions of engagement for the clutch are disposed so that about 220 degrees of clutch rotation is utilized on the lift portion of the cycle and about 140 degrees of clutch rotation is used for the lowering portion of the clutch operation.

It is seen, therefore, that the operation of the clutch 36 during the lift cycle effects a substantially constant height of the plow frame relative to the ground, irrespective of the position of the adjusting lever 52.

As the land wheel-supporting axle 18 is swung relative to the plow frame to provide the described raising and lowering of the plow bottoms, proportional movement is provided for the forward furrow wheel 12, through means including an arm 70 fixed on the crank axle 18 and a link 72 pivotally interconnecting this arm with a bracket 74 FIGURE 1, on the crank axle 14 for the forward furrow wheel. Suitable adjustment is provided for the front furrow wheel 12 independently of the adjustment of the land wheel 16, by means of the lever and quadrant arrangement 76. The adjustment thus afforded for the land wheel 16 is for known purposes, such as leveling the plow during the breaking of ground etc.

In an elongated implement structure, such as the illustrated five-bottom plow, it is also important to attend to the leveling of the machine in a longitudinal direction, in order to afford trash clearance for the plow in its transport position as well as to provide a proper and uniform disposition of the plow bottoms during all phases of the plowing operation. In the illustrated embodiment, this is provided for by the rear wheel structure 20, which is adjustably connected with the above described lift mechanism 46 for vertical adjustment in response to the vertical adjustment of the forward wheels on the plow.

As seen particularly in FIGURE 9, the rear wheel structure 20 comprises a wheel 80 which is rotatably mounted on a rearwardly extending end portion of a generally vertical spindle or axle 82. The upper portion of this spindle 82 is rotatably received within a cylindrical housing member 84 and is adjustably held against axial movement relative thereto in any known manner, such as by a set screw 86 extending through the housing into engagement with the spindle. The rearward side of the spindle housing 84 includes a pair of transversely disposed, spaced-apart bearing members 88, which provide means for supporting the housing at the rear of the plow in vertically movable relation thereto. More particularly, each of the bearing members 88 has journaled therein one leg portion of a pair of U-shaped members 90 which extend forwardly in generally parallel relation, and which have the other leg portions thereof journaled in openings provided in a pair of spaced-apart plates 92 bolted or otherwise mounted on the rear portion of the plow beam 24e. The free ends of the leg portions of the U-shaped members 90 project beyond the bearings 88 and the plate 92 to provide a pivotal support for a lower link 94 and an upper link 96, which complete the double parallel link support for the spindle housing 84.

The upper supporting link 96 has an upwardly turned portion at its forward end which provides a crank for raising and lowering the parallel linkage and the spindle housing supported thereby. More particularly, a bell crank 98 is pivotally mounted, through a pin 100, supported from the adjoining plate 92, and the rearward end of this bell crank is pivotally connected to the crank portion of the upper link 96 through a link 102. A forwardly and upwardly extending portion of the bell crank 98 also includes a pin 104 affording pivotal connection with the rear end of an adjusting rod 106 for the rear wheel structure. As seen in FIGURES 1 and 2, the adjusting rod 106 extends forwardly on the plow structure and has its forward end slidably disposed in a collar 108, FIGURE 2, which is pivotally supported in a yoke 110 fixed to the upper end of a bracket 112. The bracket 112 is bolted to the arm 44 for movement therewith upon rotation of the crank axle 18. A nut 114 which is adjustably threaded on the end of rod 106 prevents withdrawal of the rod from its collar 108, and a coil spring 116 is disposed around the rod 106 between the collar 108 and a pin 118 to afford yielding movement of the rod in a forward direction.

Thus it is seen that the rear wheel structure 20 will be raised and lowered in response to operation of the clutch 36 on the land wheel 16, through rotation of the arm 44 and the accompanying longitudinal shifting of the rod 106. The vertical movement thus afforded for the rear wheel structure is correlated with the operation of the lift linkage 46, so that the plow bottoms are essentially leveled lengthwise of the plow when the latter is in its transport and plowing positions. Further, it will be noted that, with the spring 116 positioned as described, the adjusting rod 106 is permitted to move forwardly sufficiently to absorb any shock that might be imparted to the rear wheel.

With the use of a rear furrow or tail wheel, such as wheel 80, it is important that the rear wheel be free to caster during the turning of the plow, but that this wheel be held in a generally straight path of travel during the plowing operation. In the illustrated embodiment, the rear wheel 80 is locked in position to follow the direction of travel of the plow by novel means including cooperating locking elements carried by the rear wheel and by the plow frame structure, respectively.

The structure provided for thus controlling the rear wheel 80 includes a generally cylindrical member 120, FIGURE 9, which is disposed at the top of the spindle housing 84 and is fixed to the spindle 82 for rotation therewith by a clamping element 122. A central portion of the clamp 122 includes a key 124 which engages a longitudinal groove 126 on the upper end of the spindle to thereby provide for rotation of member 120 and the spindle 82 together. The clamp 122 is detachably fixed to the cylindrical member by a pair of bolts 128 which extend through laterally extending ear portions on the clamp and through lugs projecting outwardly from opposite sides of member 120 in fixed relation thereto. The lower edge portion of the cylindrical member 120 includes an arcuate, flanged portion 132 (see also FIGURE 10) which extends approximately half way around the cylinder and includes an inwardly facing groove for receiving a circumferential rim 134 on the upper end of the spindle housing 84. The member 120 is free to rotate relative to the spindle housing, but is held against axial displacement relative thereto by a set screw 136 (FIG. 10) extending through the flange 132 to a position underlying the rim 134. The upper end of the spindle housing 84 also includes, at its rear side, a rib 138 which provides, at either edge thereof, a stop in position to engage one end of flange 132 and thereby limit the rotation of the cylindrical member 120 and the spindle 82 fixed thereto. In this way the amount of castering provided for the rear wheel 80 is controlled. Further, there is provided a set screw 140 which is threaded through the top of the member 120, and the adjustment of this screw is effective to position the spindle 82 vertically with respect to its housing 84.

The outside surface of the cylinder 120 also includes a curving flange surface 142, seen particularly in FIGURE 10, which faces forwardly on the plow and is adapted for engagement by a tapered roller 144. More particularly, roller 144 is frusto-conical in shape and is disposed so that the apex of its cone is virtually at the center axis of the spindle 82 during engagement of the curved surface 142 on the cylinder 120. The roller 144 is rotatably mounted on a shaft portion of a bracket 146 which is detachably fixed in position between plate members 92. The bracket 146 also includes a cylindrical bearing portion at one side for receiving the hereinbefore-mentioned pin 100 supporting the bell crank 98.

The curving surface 142 is designed for cooperation with the conical roller 144 in a manner such that the tangential velocity of any point on the roller about its axis is equal to the tangential velocity of a coincident point on surface 142 about the vertical axis of spindle 82, along substantially the entire length of surface 142. As a result, engagement of roller 144 with surface 142 produces a pure rolling motion for the roller 144. This not only provides for less wearing of these parts, but also enables the wheel locking mechanism to perform more smoothly and in less time than other known arrangements.

Engagement of the conical roller 144 with the curving surface 142 is, of course, effective to lock the tail wheel axle 82 against rotation within its housing 84 when the plows are lowered. This is necessary so that when the plows are in the ground, the tail wheel 80 is locked so that its direction of travel is generally parallel to the direction of travel of the plow structure. However, when the plows are raised out of the ground it is desirable that the tail wheel be free to caster, as required in turning the plow in preparation for entering a new furrow. As seen in FIGURE 9, the plows are in transport position and the conical roller 144 has been moved completely out of engagement with the curved surface 142 so that the tail wheel 80 is free to caster.

When the plow is dropped, that is the plow bottoms are lowered into the ground, through operation of clutch 36 and linkage 46, the rear tail wheel 80 is moved upwardly by virtue of the connection between rod 106 and the lift mechanism 46. As the rear wheel structure moves upwardly, the conical roller 144 engages the curved surface 142. Assuming the plow has been turning in preparation for opening a new furrow, the wheel 80 will be turned so that the roller 144 engages one of the upper edges of the surface 142, as indicated in FIGURE 10 at 144a and 144b, depending upon the direction in which wheel 80 is turned. Of course, if the tail wheel 80 is already in line with the direction of travel of the plow, the conical roller 144 will move directly into the bottom of the curved surface 142, as indicated at 144c in FIG. 10.

By virtue of the described relationship between the roller 144 and surface 142, as the roller engages one of the upwardly facing edge surfaces of the curving member 142, it will roll along this surface and down the side wall thereof into the centered locking position, indicated as position 144c for the roller. In this respect, it will be noted that, in the selected embodiment, one of the side wall portions 142a of surface 142 is substantially higher than the opposite side wall 142b and includes a generally straight portion. This design is for the purpose of providing greater stability for the rear wheel, against the normal lateral thrust on this wheel during plowing, regardless of the depth of plowing and the corresponding vertical adjustment of the rear wheel 80. As the plow is raised to a shallower depth of penetration there is, of course, a corresponding adjustment of the rear tail wheel, and unless there is sufficient depth given to the curved surface 142 there may be a tendency for the conical roller 144 to jump out of its locked position and permit the tail wheel to caster. This is undesirable and, consequently, the long straight wall portion 142a has been placed on the side in the direction of the lateral thrust normally placed on the plow structure. Another reason for the use of one generally straight side along the curving surface 142 is to better maintain the tail wheel 80 in position when the plow bottoms strike an object and the entire structure is raised vertically. When this occurs, the momentary raising of the roller 144 will not immediately result in a release of the wheel, as the normal lateral thrust on the tail wheel will hold the roller against wall 142a and the roller will then drop back into its locking position seen at 144c.

Moreover, with the illustrated design for the curving surface 142 there is advantage in connection with moving the plows into their soil working position. Ordinarily, in moving into position, the plow is making a right turn and, in such case, the roller 144 will initially engage the upwardly facing edge portion of the higher wall portion 142a. Consequently, the rear end of the plow will be maintained in a higher position somewhat longer as the plow is being directed into position, and the plow points will be tilted downwardly to allow them to pierce the ground before the roller 144 moves inwardly along surface 142 and the tail wheel is actually locked in its plowing position. This is very desirable because, when coming out of the right hand turn, the ground forces against the plow bottoms are the greatest and considerable guidance and stability is required for the plow in this circumstance. The same is not true to any substantial degree when coming out of a left hand turn and the plows are entering the ground. In the latter instance, the plow bottoms are slicing into the ground and the forces are considerably less than in the case of the right hand turn where considerable pressure is being exerted against the landsides of the plows.

The above described adjustments afforded for the land wheel 12, the furrow wheel 16 and the tail wheel 80 correlate the vertical movement of the three wheels, so that in entering or leaving the soil the plow bottoms are essentially level with the ground. This is particularly important in connection with breaking ground. It is important that each of the plow bottoms enter the ground at essentially the same time and at the same angle with respect to the ground, if maximum efficiency is to be achieved.

Another feature of the described embodiment is its convertibility to a four-bottom plow, when such is desired. The plow beam 24e, being bolted to the rear frame member 26 and to the adjoining plow beam 24d, is readily removable. Further, the entire rear wheel structure 20, including the attaching plates 92, is removable from the rear of plow beam 24e and is then bolted in position at the rear of the fourth plow beam 24d. In order to maintain the adjusting rod 106 in proper position with respect to the lift linkage 46, i.e. generally parallel to the direction of travel of the plow, there is also provided a suitable adjustment for the position of the yoke 110 supporting the forward end of rod 106. Looking at FIGURE 2, it will be noted that the yoke-supporting bracket 112 is disposed at an angle with respect to the arm 44 on crank axle 18. By detaching the bracket 112 and placing it on the opposite side of arm 44 in outwardly diverging relation thereto, the yoke 110 is thereby properly positioned to receive the forward end of rod 106 so as to position the rod parallel to the path of travel for the plow.

It is seen from the foregoing, therefore, that there is provided herein adjusting mechanism for a wheel supported ground working tool, which is particularly effective to provide a constant or uniform lifting height for the earth-working tool, irrespective of the selected depth adjustment for the tool. Then too, the adjustments provided for the three supporting wheels of the plow are correlated so that the plow bottoms are held in a level position when entering or leaving the ground, as well as when they are in soil-working position. Moreover, there is provided a novel arrangement for locking the tail wheel in position during plowing, which arrangement is particularly advantageous in that it eliminates essentially all friction between the locking components during the necessary relative movement therebetween. The described locking arrangement for the tail wheel is also advantageous in that it prevents inadvertent release of the tail wheel, as by the plow striking an object, and pays particular attention to the control of the wheel during turning movement of the plow, so that the rear of the plow is held elevated until the bottoms are properly positioned to enter the ground and the rear wheel is then securely locked in position.

Although shown and described with respect to particular structure, it will be apparent that the disclosed construction is subject to modifications apparent to those skilled in the art without departing from the principles of this invention.

We claim:

1. An agricultural implement comprising a frame, a crank axle swingably connected with said frame and carrying a ground wheel for movement therewith relative to said frame, a lifting clutch on said crank axle adapted to be driven from said ground wheel and having a clutch-operated crank arm, a lift link pivotally connected at its lower end to said crank arm, an adjusting quadrant, an adjusting lever pivotally connected adjacent one end thereof with an arm fixed on said crank axle and said lever being also pivotally connected at an intermediate portion thereof to a rear portion of said adjusting quadrant for movement relative thereto, an additional link pivotally interconnecting a forward portion of said adjusting quadrant with said frame, and the upper end of said lift link having a pivotal connection with a portion of said quadrant intermediate said pivotal connections of the quadrant with said lever and with said additional link.

2. An agricultural implement comprising a frame, a crank axle swingably supported on said frame and carrying a ground wheel for vertical swinging movement therewith relative to said frame, a lifting clutch on said crank axle adapted to be selectively driven from said ground wheel and having a clutch-operated crank arm, a lift link pivotally connected at its lower end to said crank arm, an adjusting quadrant having an arcuate, notched portion, an adjusting lever pivoted on said quadrant and including means for selectively engaging a notch on said quadrant, means supporting said quadrant on said frame comprising a double-pivot toggle linkage including an arm pivotally connecting said crank axle with an end portion of said adjusting lever and an additional link pivotally interconnecting a forward portion of said adjusting quadrant with said frame, and the upper end of said lift link having a pivotal connection with a portion of said quadrant intermediate said pivotal connections of the quadrant with said arm and with said additional link.

3. In a wheel supported plow having a frame supporting a plurality of plow bottoms, a crank axle swingably mounted on said frame and carrying a ground wheel for vertical swinging movement therewith relative to said frame to thereby move said plow bottoms relative to the ground, a lifting clutch on said crank axle adapted to be selectively driven from said ground wheel and having a rotatable clutch-operated crank arm, and a lift link pivotally connected at its lower end to said crank arm, adjusting mechanism comprising an adjusting quadrant which is supported fore and aft by a double pivot toggle linkage including a first link connection with said frame at a forward portion of said quadrant and second link connection adjacent the rear portion of said quadrant with said crank axle, said second link connection being provided by an adjusting lever which is pivotally carried by said quadrant for movement through the adjusting arc defined by the latter, and said quadrant having a pivotal connection with the upper end portion of said lift link at a position on the quadrant intermediate said first and second link connections.

4. In a ground working agricultural implement having a frame, a crank axle swingably mounted on said frame and carrying a ground wheel for vertical swinging movement therewith relative to said frame, a lifting clutch on said crank axle adapted to be driven from said ground wheel and having a rotatable clutch-operated crank arm, and a lift link pivotally connected at its lower end to said crank arm, adjusting mechanism comprising a generally vertically disposed adjusting quadrant which is supported fore and aft, respectively, by a first link connection with said frame and by a second link connection with said crank axle, said second link connection being provided by the lower end portion of an adjusting lever which is pivotally carried by said quadrant for movement through the arc defined by a notched portion of the latter which is adapted to be selectively engaged by said lever to provide depth adjustment for the ground working tools on the implement, whereby the double pivot toggle support thereby provided for the adjusting quadrant affords longitudinal and pivotal movement of said quadrant relative to said frame, and said quadrant having a pivotal connection with the upper end portion of said lift link at a position on the quadrant intermediate said first and second link connections.

5. In an agricultural implement having a frame, a crank axle swingably mounted on said frame and carrying a ground wheel for swinging movement therewith relative to said frame, a lifting clutch on said crank axle adapted to be driven from said ground wheel and having a clutch-operated crank arm, and a lift link pivotally connected at its lower end to said crank arm, adjusting mechanism comprising an adjusting quadrant having an adjusting lever pivotally connected thereto for movement through the arc defined by a notched portion of said quadrant, means for selectively engaging said lever with a notch on said quadrant, said adjusting lever being also pivotally connected at one end with an arm fixed on said crank axle at a position on said lever spaced from the pivotal connection with said quadrant, to thereby provide a first connection between said quadrant and said crank axle, a link pivotally interconnecting said frame with a portion of said quadrant spaced longitudinally therealong from said connection with said lever, to thereby provide a second connection between said quadrant and said frame, whereby said quadrant is mounted for both pivotal and longitudinal movement relative to said frame, and a pivotal connection between the upper end of said left link and a portion of said quadrant intermediate said connections thereof with said crank axle and said frame.

6. In a plow structure having a frame supporting a plurality of plow bottoms, a crank axle swingably mounted on said frame and carrying a ground wheel for vertical swinging movement therewith relative to said frame, a lifting clutch on said crank axle adapted to be driven from said ground wheel and having a clutch-operated crank arm, and a lift link pivotally connected at its lower end to said crank arm, an improved adjusting mechanism comprising an adjusting quadrant having an adjusting lever pivotally connected thereto for vertical swinging movement through the arc defined by a notched portion of said quadrant, said adjusting lever having a lower end extension thereof pivotally connected with said crank axle to thereby provide a first linkage connection between said quadrant and said crank axle, a link pivotally interconnecting said frame with a portion of said quadrant spaced longitudinally therealong from said connection with said lever, to thereby provide a second linkage connection between said quadrant and said frame, and a pivotal connection between said quadrant and the upper end portion of said lift link in position to afford movement of the lift link and said quadrant in response to adjusting movement of said lever and to effect a substantially constant height of lift for said frame upon actuation of said clutch and rotation of said crank arm when said plow bottoms are raised from their plowing position, irrespective of the position of said lever relative to said quadrant.

References Cited in the file of this patent

UNITED STATES PATENTS

| | | |
|---|---|---|
| 1,669,037 | Boda | May 8, 1928 |
| 1,725,396 | Hipple | Aug. 20, 1929 |
| 2,340,495 | Strandlund | Feb. 1, 1944 |
| 2,440,779 | Morkoski | May 4, 1948 |
| 2,519,497 | Oerman et al. | Aug. 22, 1950 |
| 2,682,822 | Toland et al. | July 6, 1954 |
| 2,706,940 | Oerman | Apr. 26, 1955 |